UNITED STATES PATENT OFFICE.

WILLIAM N. BLAKEMAN, JR., OF NEW YORK, N. Y.

OIL.

No. 883,515. Specification of Letters Patent. Patented March 31, 1908.

Application filed January 24, 1905. Serial No. 242,505.

*To all whom it may concern:*

Be it known that I, WILLIAM N. BLAKEMAN, Jr., a citizen of the United States, and resident of the borough of Manhattan, in the city, county, and State of New York, have invented certain new and useful Improvements in Oils, which invention is fully set forth in the following specification.

The object of this invention is to produce an oil-vehicle which shall be particularly applicable for use with those pigments which carry no water in combination and were formerly known as anhydrous, but which may also be designated as pigments containing no hydroxyl. Pigments free from hydroxyl do not form satisfactory compounds, are deficient in spreading power, and are very slow in drying, when ground in the usual oil vehicle; and Dutch lead, in consequence of its quick formation of a saponaceous compound—due to the hydrated oxid of lead which it carries in combination—has, heretofore, been regarded as the only white pigment suitable for use as a sole basis for paint.

I have discovered that commercial linseed and other oils can be so treated that all pigments ordinarily deficient in spreading power shall, when ground therein and applied as paints, form satisfactory compounds, spread in a smooth uniform and elastic film, and dry rapidly—in all respects equal to the combination of white lead in linseed oil. This I accomplish by incorporating with the oil a hydrated fatty agent.

I carry out my process by incorporating with commercial linseed oil, or other oil (animal or vegetable), a hydrated agent composed of an oil or fat, or a fatty derivative of an oil or fat, in a state of hydration.

To form my hydrated fatty agent I take linseed oil for example, and hydrate it, which may be done in several ways:

First. It may be exposed in shallow vessels, with broad surfaces, to the action of air and light, until it has been sufficiently hydrated, which may require several months, the time depending upon climatic conditions. To test the oil, the film test may be resorted to. When from one to two per cent. of the oil so treated is incorporated with 100 parts of commercial linseed oil and this vehicle ground with 240 parts of either lead sulfate or sublimed lead, with the usual quantity of liquid drier, and, being spread as a paint, it follows the brush in a smooth, homogeneous and uniform film, does not run, crack or craze, and dries in from 3 to 5 hours, according to climatic conditions, the oil may be deemed in a satisfactory state for use as a hydrated agent for the vehicle and pigment used, and the hydration process may be arrested.

Second. The oil may be placed in vessels having broad surfaces and these vessels suspended over a body of water, with a covering suitably arranged to retain a vaporous atmosphere in contact with the oil. This will shorten the process to a few weeks.

Third. The oil may be placed in vessels having broad surfaces, with about one per cent. of water distributed on the bottom, and these vessels exposed to light and the oil agitated at intervals until the water has been absorbed and combined in the oil. This method may also require a few weeks, but may be shortened to 6 or 8 days if the vessels be exposed to continuous bright sunlight.

Fourth. The oil may be heated in a vessel, suitably arranged for observation, at a temperature of about 140° Fahr. with one per cent. of distilled water distributed on the bottom in as small globules as possible to increase contact area. The water will soon take on the appearance of encystment, and I use gentle agitation to break up the encystation as fast as it forms, until all has been absorbed and combined in the mass of oil, which will take from 8 to 10 hours.

Fifth. The oil may be first oxidized by heating the raw oil on oxidizers; or by submitting it, with heat, to the action of pure oxygen under pressure; or by passing through it, with heat, thoroughly dried air; or by adding to it a percentage of highly oxidized, or boiled oil of commerce; and then when the oil has been so oxidized to any degree desired, it may be hydrated in any of the ways above described.

After hydration, the oil may be used immediately as a hydrated agent, but if allowed to stand for several days, in the light, for "blending" or "aging", it will be found advantageous.

I now incorporate from one to two per cent. of this highly hydrated oil, raw or oxidized, with commercial linseed, or other, oil, (with which it is miscible) and such vehicle is then ready to receive the pigment.

Any animal or vegetable oil or fat, or a fatty derivative thereof, such as oleic acid, stearic acid, or their glycerids, stearin, olein and the like, may be hydrated and used as a hydrated agent in carrying out my invention:

but I prefer to use either hydrated linseed oil or hydrated tung oil. Commercial linseed, tung or other oil (animal or vegetable), treated with a hydrated agent as above described, will not be appreciably affected in fluidity, and an analysis of the same will show the presence therein of a hydrated fatty acid or acids not found in fresh commercial oil. Oil so treated with a hydrated agent will be found to form a satisfactory compound with, and impart spreading power to, all pigments which ordinarily are deficient in spreading power when ground in oil. Among the pigments which may be used, either singly or in combination, are lead sulfate, lead sulfite, anhydrous carbonate of lead, sublimed lead (also called oxysulfate or zinco-sulfate of lead) zinc oxid, zinc sulfid, barium sulfate, barium carbonate, calcium carbonate, strontium sulfate, strontium carbonate, and the like. Thus, 100 parts of commercial linseed oil having a hydrated fatty agent combined therewith as above described, when ground with 240 parts of sulfate of lead, or 240 parts of zinco-sulfate of lead, or 80 parts each of lead sulfate and zinc oxid, and spread as a paint (with the usual quantity of liquid drier) will follow the brush in a smooth and uniform film, in all respects equal to white lead in linseed oil, and will dry in from 3 to 5 hours according to climatic conditions. The degree of hydration of the hydrated agent, and the proportion of this agent to be introduced into commercial oil may be varied in practice, and will depend partly upon the character of the pigment with which the oil is to be used. The fatty agent should not be caused to exhibit too great a degree of hydration, as it will then no longer be entirely miscible with, or soluble in, commercial oil, and will clot and flock and tend to defeat the process. From one to two per cent. of a fatty agent hydrated with one per cent. of water, will be found sufficient for nearly all the pigments named, although in making some combinations of oxids, carbonates and other salts, more may be required—a matter which can be easily regulated in practice. For use with zinc pigments the agent should be hydrated with a slightly larger percentage of water than is necessary for lead pigments, or else a larger percentage of the hydrated agent should be used in the oil vehicle.

The most remarkable hydrated oil which may be used as an agent is hydrated tung oil. One per cent. of tung oil, hydrated with from one half to five eighths of one percent. of water, or one half of one per cent. of tung oil hydrated with from $1\frac{1}{4}$ to $1\frac{1}{2}$ per cent. of water, incorporated with fresh linseed oil, will give a beautiful smooth and creamy film when ground with any of the pigments named. The tung oil may be hydrated by any of the methods above described for linseed oil, but its behavior under treatment will be found different, as no encystation occurs when it is exposed, or heated, with water.

Two or more oils, drying or non-drying, may be combined to form a vehicle, if desired. Heat, pressure, and agitation may be used at any stage of the process if deemed advisable.

I do not herein claim a paint-compound made as herein described, the same being claimed in my application No. 301568, filed February 17, 1906.

Having thus fully described my invention, I claim:

1. A compound or mixture of a drying fatty oil and a hydrated fatty agent.

2. A compound or mixture of a drying fatty oil and a hydrated oil.

3. A compound or mixture of linseed oil and hydrated tung oil.

WM. N. BLAKEMAN, JR.

Witnesses:
FRANCIS P. REILLY,
CHAS. A. KANE.